US011897716B2

(12) United States Patent
Schlothauer et al.

(10) Patent No.: US 11,897,716 B2
(45) Date of Patent: Feb. 13, 2024

(54) NO-FEED-ROLL CORRUGATED BOARD OR PAPERBOARD SHEET FEEDER RETROFIT APPARATUS AND METHOD

(71) Applicant: Sun Automation, INC., Glen Arm, MD (US)

(72) Inventors: Aaron Schlothauer, Parkville, MD (US); Ryan Garis, York, PA (US); Craig Propert, Glen Burnie, MD (US); Terry Hartlaub, Spring Grove, PA (US)

(73) Assignee: Sun Automation, INC.

( * ) Notice: Subject to any disclaimer, the term of this patent is extended or adjusted under 35 U.S.C. 154(b) by 165 days.

(21) Appl. No.: 17/002,538

(22) Filed: Aug. 25, 2020

(65) Prior Publication Data

US 2022/0063938 A1 Mar. 3, 2022
US 2024/0002177 A9 Jan. 4, 2024

Related U.S. Application Data

(63) Continuation of application No. PCT/US2019/019574, filed on Feb. 26, 2019.
(Continued)

(51) Int. Cl.
*B65H 3/12* (2006.01)
*B31B 50/07* (2017.01)
(Continued)

(52) U.S. Cl.
CPC ........... *B65H 3/063* (2013.01); *B31B 50/042* (2017.08); *B31B 50/064* (2017.08); *B31B 50/07* (2017.08);
(Continued)

(58) Field of Classification Search
CPC ..... B31B 50/005; B31B 50/064; B31B 50/07; B31B 50/042; B65H 3/063; B65H 3/08; B65H 3/085; B65H 3/122; B65H 3/126
See application file for complete search history.

(56) References Cited

U.S. PATENT DOCUMENTS 4,181,298 A 1/1980 Capdeboscq
4,632,381 A 12/1986 Cuir et al.
(Continued)

FOREIGN PATENT DOCUMENTS

EP 0537596 A1 10/1992
JP 2007-176703 7/2007
(Continued)

OTHER PUBLICATIONS

English translation of Office Action issued by Japanese Patent Office dated Feb. 7, 2023 (pp. 1-7) for Japanese Patent Application No. 2020-544785.
(Continued)

*Primary Examiner* — Joshua G Kotis
(74) *Attorney, Agent, or Firm* — McKinney & Associates, LLC; J. Andrew McKinney, Jr.

(57) ABSTRACT

A self-contained no-feed-roll computer controlled corrugated board or paperboard sheet feeder apparatus 200 is configured to upgrade an installed corrugated board processing machine (e.g., 10) and includes a feed table surface 210 for boards (e.g., 2) having drive wheels (222W, 224W, 226W) in an initial variable velocity zone 220 which drives the board in a first motion profile through a first vacuum zone, and a second velocity zone 230 which then drives the board in a second motion profile through a second vacuum zone Retrofittable sheet feeder 200 also includes a controller 300 configured to receive predetermined velocity signals from the host machine 10 and generate (i) a first initial variable velocity control signal for initial variable velocity
(Continued)

zone 220 and (ii) a second velocity control signal for second velocity zone 230 in response.

4 Claims, 14 Drawing Sheets

Related U.S. Application Data

(60) Provisional application No. 62/635,373, filed on Feb. 26, 2018.

(51) Int. Cl.

*B31B 50/06* (2017.01)
*B65H 3/06* (2006.01)
*B65H 5/02* (2006.01)
*B31B 50/04* (2017.01)

(52) U.S. Cl.

CPC ............. *B65H 3/126* (2013.01); *B65H 5/021* (2013.01); *B65H 2403/481* (2013.01); *B65H 2403/50* (2013.01); *B65H 2406/30* (2013.01)

(56) References Cited

U.S. PATENT DOCUMENTS

| | | | | | |
|---|---|---|---|---|---|
| 5,006,042 | A * | 4/1991 | Park | B65H 5/222 | 271/111 |
| 5,048,812 | A * | 9/1991 | Holmes | B65H 3/063 | 271/11 |
| 5,184,811 | A * | 2/1993 | Sardella | B65H 3/126 | 271/118 |
| 5,228,674 | A * | 7/1993 | Holmes | B65H 3/063 | 271/11 |
| 6,543,760 | B1 * | 4/2003 | Andren | B65H 3/063 | 271/99 |
| 6,824,130 | B1 * | 11/2004 | Sardella | B65H 3/063 | 271/112 |
| 8,100,397 | B2 | 1/2012 | Sardella | | |
| 9,162,834 | B1 * | 10/2015 | Lee | B65H 3/063 | |
| 9,539,785 | B2 * | 1/2017 | Babcock | B31B 50/88 | |
| 2005/0079966 | A1 | 4/2005 | Moshier et al. | | |
| 2006/0230565 | A1 | 10/2006 | Phillips, III et al. | | |
| 2007/0145664 | A1 | 6/2007 | Sardella | | |
| 2007/0164503 | A1 * | 7/2007 | Levin | B65H 3/063 | 271/204 |
| 2014/0037353 | A1 | 2/2014 | Kodama et al. | | |
| 2016/0280484 | A1 * | 9/2016 | Baum | B65H 3/0692 | |
| 2017/0152117 | A1 * | 6/2017 | Tsukasaki | B65H 3/56 | |
| 2018/0009616 | A1 * | 1/2018 | Kodama | B31B 50/006 | |

FOREIGN PATENT DOCUMENTS

| | | | |
|---|---|---|---|
| JP | 2016-050071 | 4/2016 | |
| WO | WO 90/05103 A1 | 5/1990 | |
| WO | WO-2019165423 A1 * | 8/2019 | B65H 3/063 |

OTHER PUBLICATIONS

English Abstract of JP H04504552 dated Aug. 13, 1992 (1 page).

* cited by examiner

NO-FEED-ROLL CORRUGATED BOARD OR PAPERBOARD SHEET FEEDER RETROFIT APPARATUS AND METHOD

REFERENCE TO RELATED APPLICATIONS

This application claims priority to (a) related and commonly owned U.S. provisional patent application No. 62/635,373, filed Feb. 26, 2018 and entitled "No-Feed-Roll Corrugated Board or Paperboard Sheet Feeder Retrofit Apparatus and Method" and (b) PCT patent application No. PCT/US19/19574, filed Feb. 25, 2019 also entitled "No-Feed-Roll Corrugated Board or Paperboard Sheet Feeder Retrofit Apparatus and Method", the entire disclosures of which are hereby incorporated herein by reference. The corrugated board processing subject matter of this invention is also related to the following commonly owned U.S. Pat. Nos. 5,184,811, 6,824,130 and 9,539,785, the entire disclosures of which are also incorporated herein by reference.

BACKGROUND OF THE INVENTION

Field of the Invention

The present invention relates to feeder machines for corrugated boards or sheets, and to a system and method for retrofitting a new sheet feeder to an installed, operating corrugated board processing machine such as a box making machine.

Discussion of the Prior Art

Box making machines such as that shown and described in applicant's commonly owned U.S. Pat. No. 9,539,785 (and illustrated in FIGS. 1A), often incorporate a sheet feeder (e.g., 12) to feed a selected number of corrugated board or paperboard sheets (from a stack of corrugated boards or sheets 2 which are initially at rest) into a box making machine's inlet at a selected board travel velocity. As noted above, the assignee of this invention also owns U.S. Pat. No. 5,184,811 (on the Extend-O-Feed™ brand sheet feeder) and U.S. Pat. No. 6,824,130 on a Nip Roll equipped sheet feeder (e.g., as illustrated in FIG. 1B). An installed, operating corrugated board or sheet processing machine such as a box making machine or paperboard finishing machine accepts a pile of blank corrugated sheets or boards 2 and performs sequential operations on each sheet. A typical procedure includes printing graphics and cutting holes into a blank sheet of corrugated board or paperboard. Precise positioning of each sheet is critical and the term "Registration" refers to the accuracy of multiple prints or cuts on a single board or sheet. To achieve proper registration, all sections of a machine are inter-connected and running at (ideally) exactly the same pre-determined linear speed. Preferably, a gear train is driven by a single motor. The first unit must accept a stationary sheet or board and accelerate the board to the pre-selected linear machine speed (or predetermined surface velocity) over a short distance.

Methods of feeding paperboard sheets have evolved over time. One of the original designs utilized a kicker bar to push a sheet into the machine. Later designs began moving a sheet by pulling it from below with wheels or belts. These are referred to as "lead edge feeders" and are found on most modern machines. Almost all machines rely on a pair of rolls forming a board-receiving and engaging gap or nip that receives, pulls and then drives the sheet into the machine. A feed table is designed to accelerate the sheet or board to match the predetermined linear speed of the feed rolls 3. These "nip" rolls (e.g., 3U and 3L, as shown in FIG. 1B) then take control of the paperboard sheet and continue feeding it into the machine.

An "extended stroke" apparatus and method was developed to continue supporting the sheet after passing the feed roll nip. Sheets that have creases perpendicular to the direction of travel can momentarily lose contact or float in the feed roll nip and affect registration. A cross-section of the sheet at this crease finds that its thickness is now less than the vertical gap or aperture defined between the feed rolls 3U and 3L, eliminating the gripping effect of the nip. A feed table with extended stroke continues to feed the sheet upstream so its travel is not interrupted when the crease travels through the nip.

Typically, the upper feed roll 3U is covered in a thick, pliable polymer or urethane coating and the lower feed roll 3L is steel with a knurled surface. In order to properly control the board, the rolls must be configured to define a nip with a gap equal to or smaller than the thickness of the paperboard. This results in some crushing of the paperboard which can weaken it and negatively affect print quality. As the upper urethane roll 3U wears, its surface velocity deviates from that of the sheet or board (which must match the pre-determined linear speed). Over time, this difference in speeds becomes large enough to affect board registration and the upper roll 3U must be replaced. Feed roll replacement requires expensive down-time and can become an excessively costly and time-consuming process.

Large paperboard finishing machines (e.g., 10) are often upgraded to extend their useful life. Upgrading may involve rebuilding a section of the machine or retrofitting a new sheet feeding system in place of an old sheet feeding system (e.g., 12). Lead edge feeders are frequently installed in place of kicker bar feed tables when upgrading. This retrofitting process requires a feed table customized to fit the enveloping or host machine (e.g., 10). A new retrofitted sheet feeder must be properly sized and precisely timed with the rest of the host machine and often directly connects to the host machine's gear train to derive mechanical power from the host machine. Such upgrades involve installation work which can last days and require extensive modifications to the pre-existing or installed corrugated board or paperboard sheet processing machine and the new sheet feeder. The resulting system typically continues to rely on the use of feed rolls, and these requirements add expense and uncertainty to the process of retrofitting an installed, operating corrugated board processing machine such as a box making machine with a new or updated sheet feeder. Sheet feeders with nip rolls or feed rolls (e.g., 3U and 3L) require adjustment to maintain the correct gap size in the nip for each type of sheet or board and if the gap is misadjusted, the feed rolls can damage or crush the sheets. The prior art includes sheet feeding mechanisms that omit nip or feed rolls (see, e.g., Prime Technology's U.S. Pat. No. 5,048,812, and FIG. 1C) which relies on mechanisms deriving mechanical power from a host machine (e.g., 10 or "M"). If a sheet feeder 10P of the type illustrated in FIG. 1C is retrofitted to an existing host machine (e.g., 10 or M), the result is a combination which is heavily dependent on the host machine's geometry and requires significant expensive modifications to (a) the host machine and (b) Prime's sheet feeder 10P during the retrofit installation process. Such modifications add to the expense of the upgrade and the duration of downtime during which the machine is unavailable for its intended use.

There is a need, therefore, for a corrugated board or paperboard sheet feeder apparatus and retrofitting method which provides a sheet feeding system that is easier and less expensive to retrofit into a pre-existing, installed operating corrugated sheet or corrugated board processing machine such as a box making machine.

OBJECTS AND SUMMARY OF THE INVENTION

Accordingly, it is a primary object of the present invention to overcome the above mentioned difficulties by providing a corrugated board or paperboard sheet feeder apparatus and retrofitting method which provides a sheet feeding feed system that is easier and less expensive to retrofit into a pre-existing, installed operating corrugated sheet or corrugated board processing machine such as a box making machine.

Briefly, the No-Feed-Roll corrugated board or paperboard sheet feeder apparatus and retrofitting method of the present invention provides a corrugated board or paperboard sheet feeder apparatus and retrofitting method that is easier and less expensive when retrofit into a pre-existing, installed operating corrugated sheet or corrugated board processing machine such as the box making machine 10 illustrated in FIG. 1A.

The present invention includes an apparatus for feeding corrugated boards or sheets into a machine in which downstream sections perform operations on the sheet. Traditionally, these machines have relied on two parallel rolls (e.g., feed rolls or nip rolls 3U and 3L, as shown in FIG. 1B) to create a nip that pulls the lowermost sheet from a stack of sheets or boards (e.g., 2). In order to grip the sheet, this nip (i.e., the inter-roll gap between rolls 3U and 3L) must be equal to or smaller than the sheet thickness, which often results in crushed sheet substrate. Sheets are manufactured with more material to compensate for this crushing action. The present invention eliminates the crushing nip action of those prior art sheet feeders and replaces the nip action with a feed table with wheels that accelerate the sheet and vacuum pressure to maintain traction between the sheet (e.g., 2) and the wheels.

The method and apparatus of the present invention is not dependent on the host machine for motive power and instead is an entirely self-contained computer-controlled unit which is driven with one or more motors, using data or signals from the host machine only as speed reference input to a controller. Critical functions are performed by a feed table section and those critical functions are parameterized such that they can be scaled to different machinery with a change in a program executed in the controller. The host machine is preferably modified to accept the feed table section. In the event that one or more of the prior art-style feed rolls is a necessary component of the host machine drive train, the sheet feeder apparatus and retrofitting method of the present invention can be adapted to maintain that drive train.

The feeding apparatus of the present invention consists of divided vacuum boxes with a plurality of wheeled shafts (or belts or linear actuators) configured to engage and accelerate the lowermost sheet in a stack of sheets (e.g. 2). These wheeled shafts are preferably sequentially arrayed in one or more variable velocity zones leading to a constant velocity zone residing above or below the path of travel. Each velocity zone is independently driven with a dedicated electric motor. An initial or first variable velocity zone always performs the entire motion profile to accelerate the sheet into the machine. An optional second variable velocity zone, following the first, comes in contact with the sheet some distance after the sheet begins accelerating. This second velocity zone only needs to perform a fraction of that velocity profile due to the nonzero initial velocity of the sheet as it enters the second zone from the first zone. During inactive periods, this second velocity zone decelerates to the nonzero initial sheet velocity, rather than zero, in anticipation of the next cycle. A final "constant velocity" zone is driven at a selected constant velocity matching the machine velocity as exactly as possible. The final constant velocity zone is located such that the previous (e.g., first and second) zone(s) have already accelerated the sheet to the selected constant velocity some distance before the sheet contacts the final stage wheels.

The primary servo motor in the initial variable velocity zone performs a specific motion profile designed to reduce the peak torque requirements of the machine. The peak torque specification is one of the leading limitations of commercially available servo motors. At the same time, traditional feeders need a significant amount of power to accelerate a sheet to machine velocity over a relatively short distance. To reduce required peak torque, the velocity profile for the sheet feeder of the present invention is designed to accelerate the sheet at a lower rate than what would normally be required over a specific distance. The primary servo motor in the initial velocity zone makes up for this by accelerating the sheet above machine speed momentarily so that the sheet will "catch up." The primary servo motor in the initial velocity zone then decelerates the board to the selected machine velocity. The primary servo motor in the initial velocity zone performing such a motion profile requires a higher maximum velocity, but a lower peak torque rating than would otherwise be needed. By returning the board to the selected machine velocity at the proper time, it is ensured that the longest sheet that can be fed (maximum sheet) capability is not diminished. The sheet feeder configuration and retrofit method of the present invention insures that the retrofitted board or paperboard host machine, with the retrofitted feeder of the present invention, can accept and process the largest possible maximum feedable sheet size (e.g., 100% of the host machine's size), which will usually be increased over the pre-retrofit maximum feedable sheet size (which is typically usually 92% of the host machine's size).

While vacuum pressure is needed throughout the feed table of the present invention, it is preferably divided into at least two sections. A first or initial vacuum section handles the environment of the initial vacuum box, where the stack of sheets (e.g., 2) always restricts the airflow and high pressure holds the sheets down. A second vacuum section comprises an open-air vacuum box that is only covered for a fraction of the machine cycle by the sheet being fed. This second vacuum section needs to be maintained with a separate high flow vacuum blower. Both vacuum sections include boxes which have a lateral restricting mechanism to alter the vacuum area based on the sheet size. This lateral vacuum restriction is preferably performed by manually operating a series of flaps on the outside of the feed table. Alternatively, in accordance with the present invention, an electrically-controlled mechanism adjusts two opposing baffles symmetrically using a single source of motion, and in applications or host machines of an asymmetrical configuration, two or more motors may be employed. An automated embodiment of the system of the present invention includes a pressure transducer to monitor vacuum and stop moving the baffles (or change the vacuum pump speed) when the desired vacuum is achieved. Alternatively, the baffles may be moved to a pre-selected and calibrated location based on input sheet size or a particular job's requirements (or recipe).

Previous feed table designs have used a four-bar linkage mechanism to control the sheet. The sheet being fed needs to contact the driving wheels, but the following sheet cannot make contact with rotating wheels without risk of causing a jam. A mechanism raised a series of control surfaces in unison above the driving wheels when contact was not desired. At the start of the next cycle, an alternating shaft would lower the surfaces and the sheet would make contact with the wheels moving at a minimal safe velocity. The linkage members were designed such that the control surfaces remained horizontal and exposed or concealed the driving wheels all at once. This design relied on the machine's feed rolls to control the sheet, and any additional driving force from the feed table wheels was nonessential extra support. Without feed rolls, the driving wheels need to assist and contact the sheet as much as possible. A new linkage design using unequal length members angles the control surface which sequentially conceals each wheel as the sheet is fed into the machine. Subsequently, the sheet is driven for a longer period of time and distance. In a resting position, the control surface sits horizontally above the driving wheels and prevents contact with the sheet. This motion can also be performed with cams raising and lowering each end of the control surface independently to create the desired angle. Either mechanism is controlled by a single servo motor performing a variable motion profile. Each variable velocity zone will require one or more mechanisms. Only the constant velocity zone does not require such a mechanism.

Another feature of the servo motion profile is the adjustable dwell period. As long as the sheet being fed is still over the driving wheels, the wheels can continue to drive the board. This can continue until either the edge of the sheet, or a specific time where the wheels need to begin decelerating in preparation of the next cycle. At this time the control surface rises into place to break contact between the sheet and the wheels.

The aforesaid objects and features are achieved individually and in combination, and it is not intended that the present invention be construed as requiring two or more of the features to be combined.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, wherein.

DESCRIPTION OF THE PREFERRED EMBODIMENT

Figure 1A:
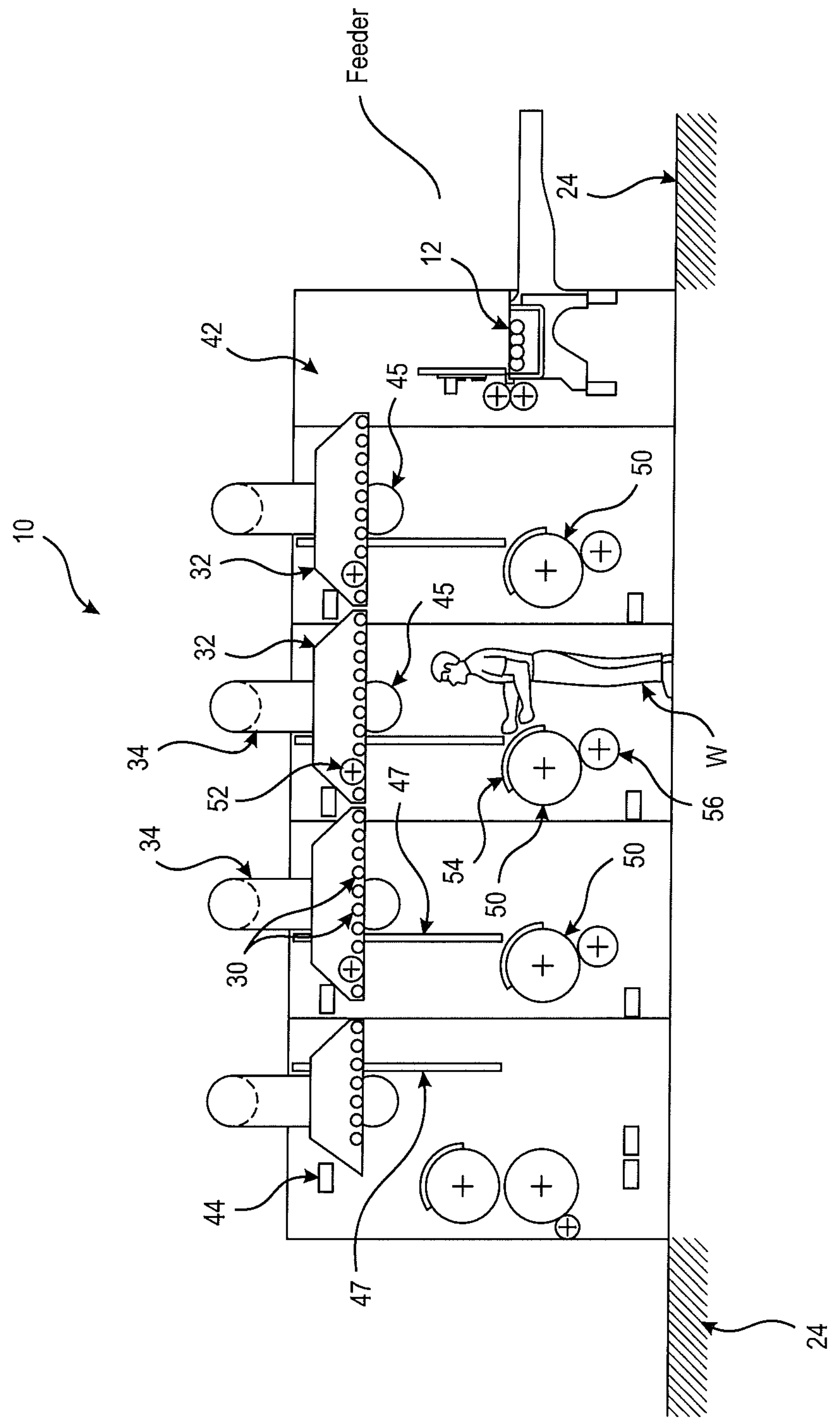
Fig. 1A Prior Art
FIG. 1A illustrates a diagrammatic side view of the feed end portion of a typical finishing machine for feeding corrugated sheets from a hopper to following machine sections, in accordance with the Prior Art.

Turning now to a more detailed description of the present invention, as illustrated in FIGS. 2-7, the sheet or board feeding system 200 and method of the present invention does not require a mechanical drive input from or mechanical coupling with the host machine (e.g., a finishing machine for folding or making boxes from corrugated boards or sheets 10 or M) and instead is an entirely self-contained unit 200 which is driven with one or more motors, using sensed velocity or speed data from the host machine (10 or M) only as a speed reference. Critical functions performed by a feed table of sheet feeding system 200 are parameterized such that they can be scaled to different machinery with a change in a program stored in and executed by controller 300 in sheet feeding system 200. The host machine (e.g., 10 or M) is preferably modified or configured to be attached to the system's feed table 210. In the event that one or more nip or feed rolls (e.g., 3U, 3L) is a necessary component of the to-be-upgraded host machine's pre-existing or legacy drive train, feeding system 200 can be configured to work with and maintain that pre-existing or legacy drive train.

Figure 5A:
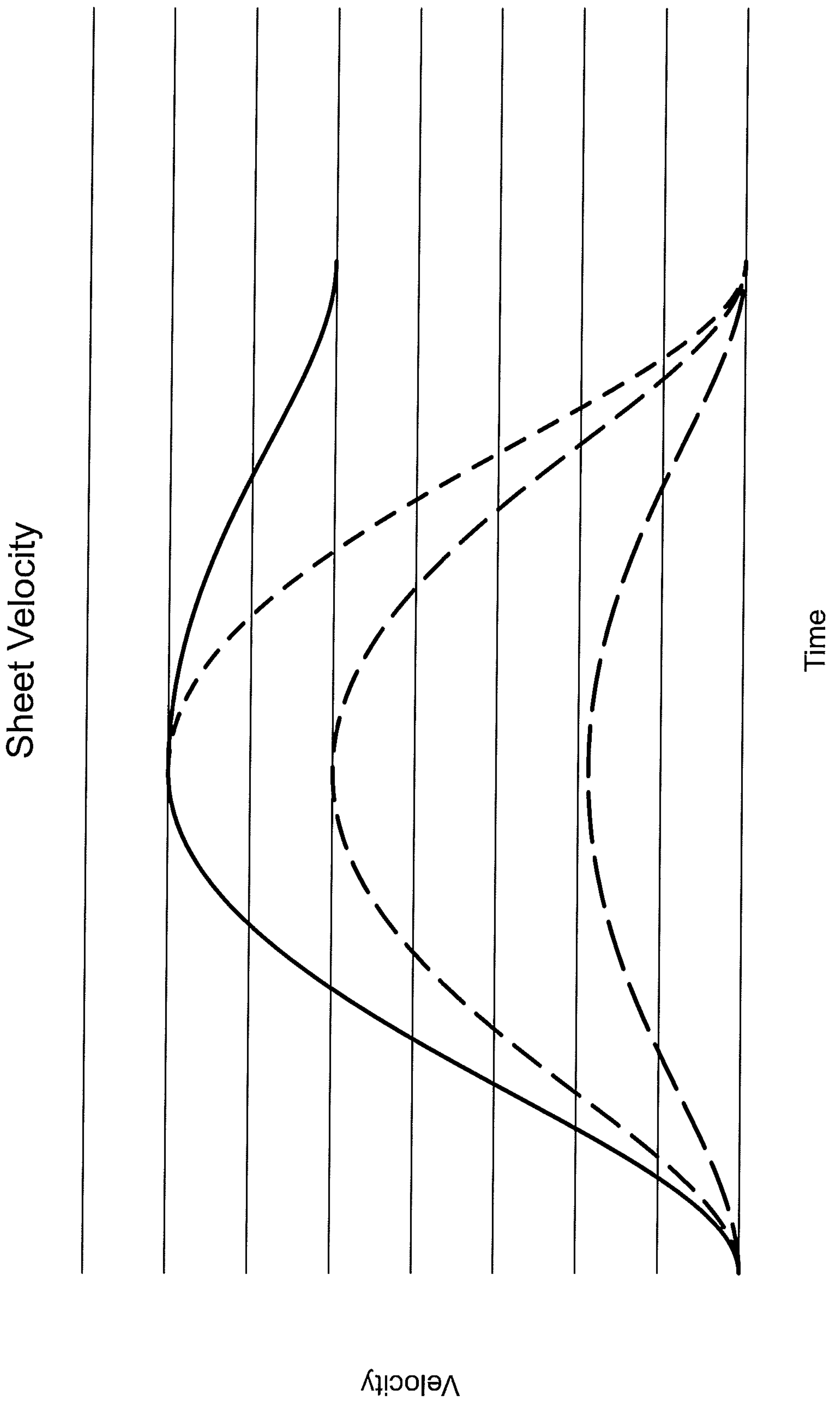
FIG. 5A is a sheet velocity data plot diagram illustrating the sheet's velocity as a function of time for the corrugated boards or sheets fed by the No-Feed-Roll sheet feeder apparatus of FIGS. 2-4 in accordance with the retrofitting and sheet feeding method of the present invention.
Figure 5B:
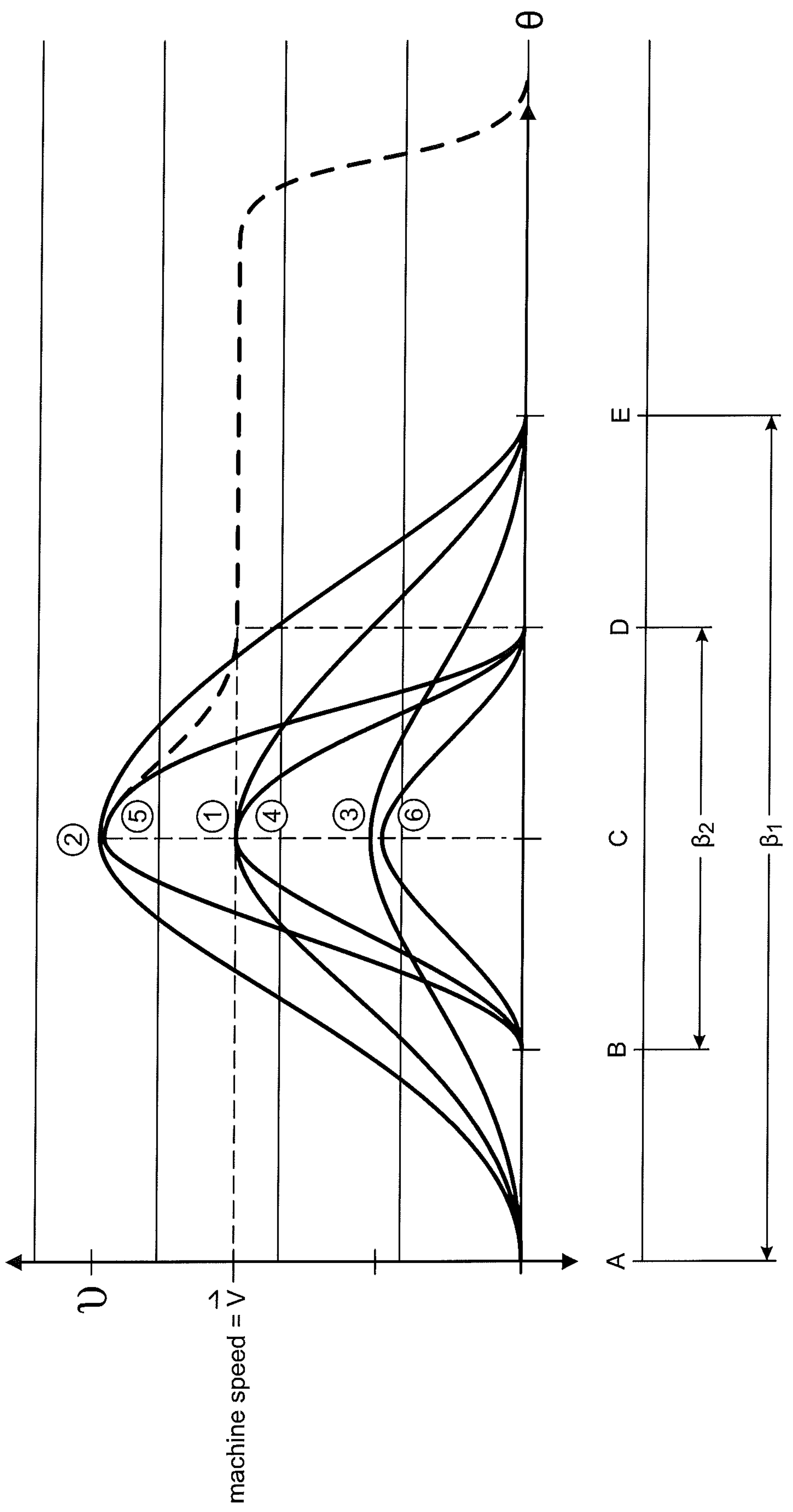
FIG. 5B is a diagram illustrating six (6) velocity profiles (machine velocity as a function of machine displacement "n" and position (A-E)) illustrating the machine speed profiles for the No-Feed-Roll sheet feeder apparatus of FIGS. 2-4B and retrofitting method of the present invention.
Figure 5C:
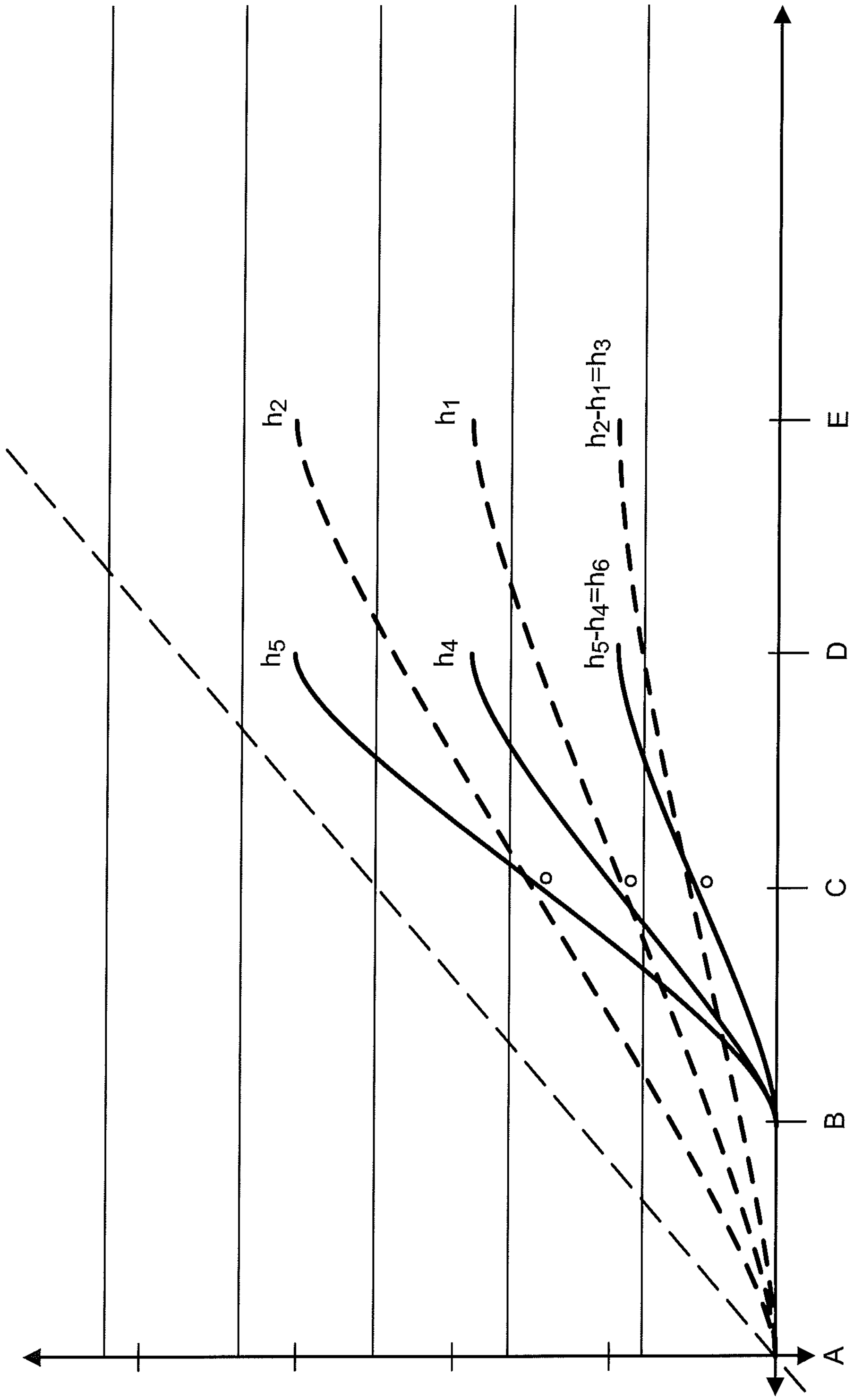
FIG. 5C is a diagram illustrating six (6) board displacement profiles (board or sheet displacement "h" as a function of position) illustrating the board displacement profiles for the No-Feed-Roll sheet feeder apparatus of FIGS. 2-4B and retrofitting method of the present invention.
Figure 5D:
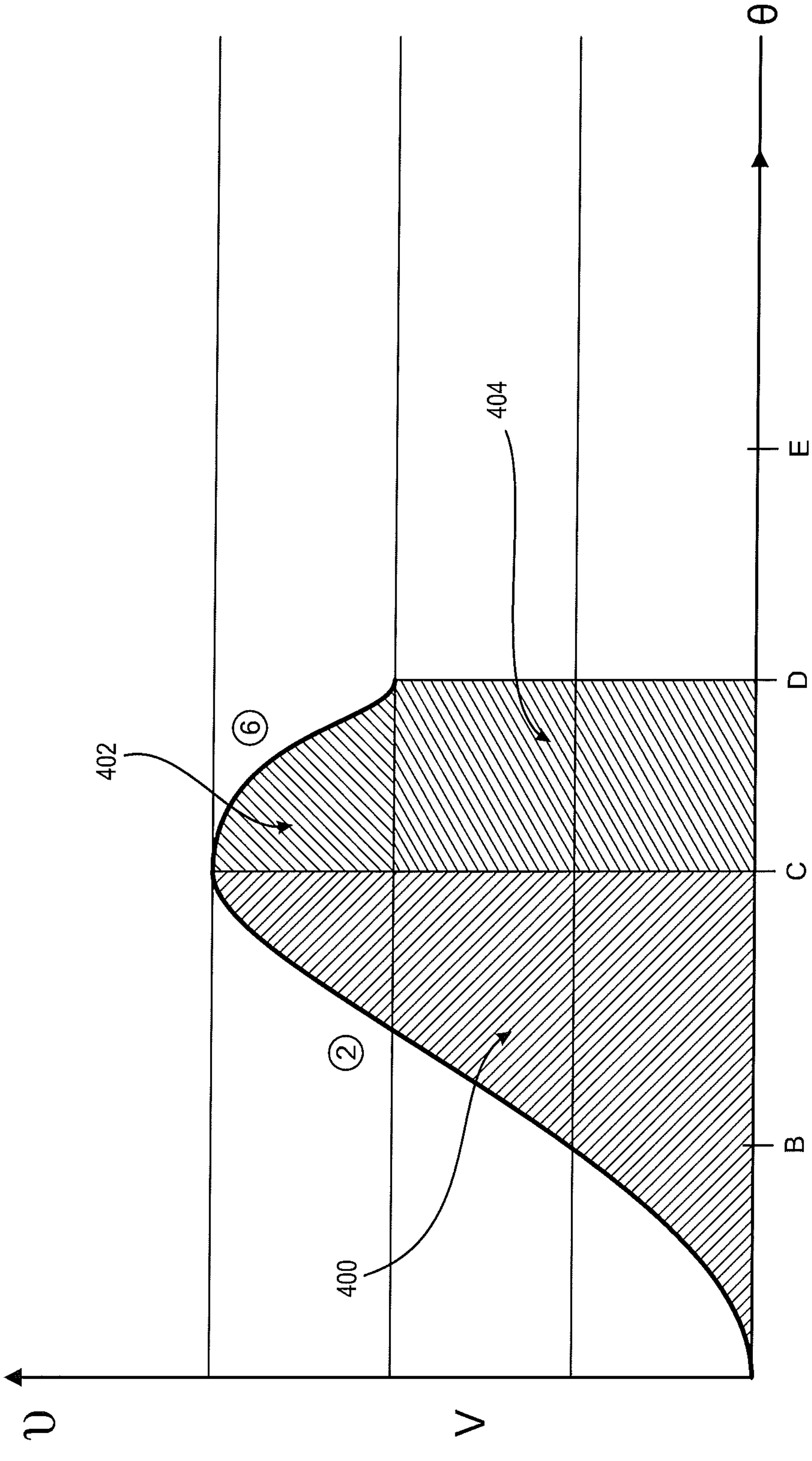
FIG. 5D is a diagram illustrating board displacement profiles (velocity as a function of position, illustrating three areas, namely, board displacement from A to C, board displacement due to the second half of the h6 curve and the area under the velocity curve due to shifting of the second part of h6 up to match h2) for the No-Feed-Roll sheet feeder apparatus of FIGS. 2-4B and retrofitting method of the present invention.
Figure 5E:
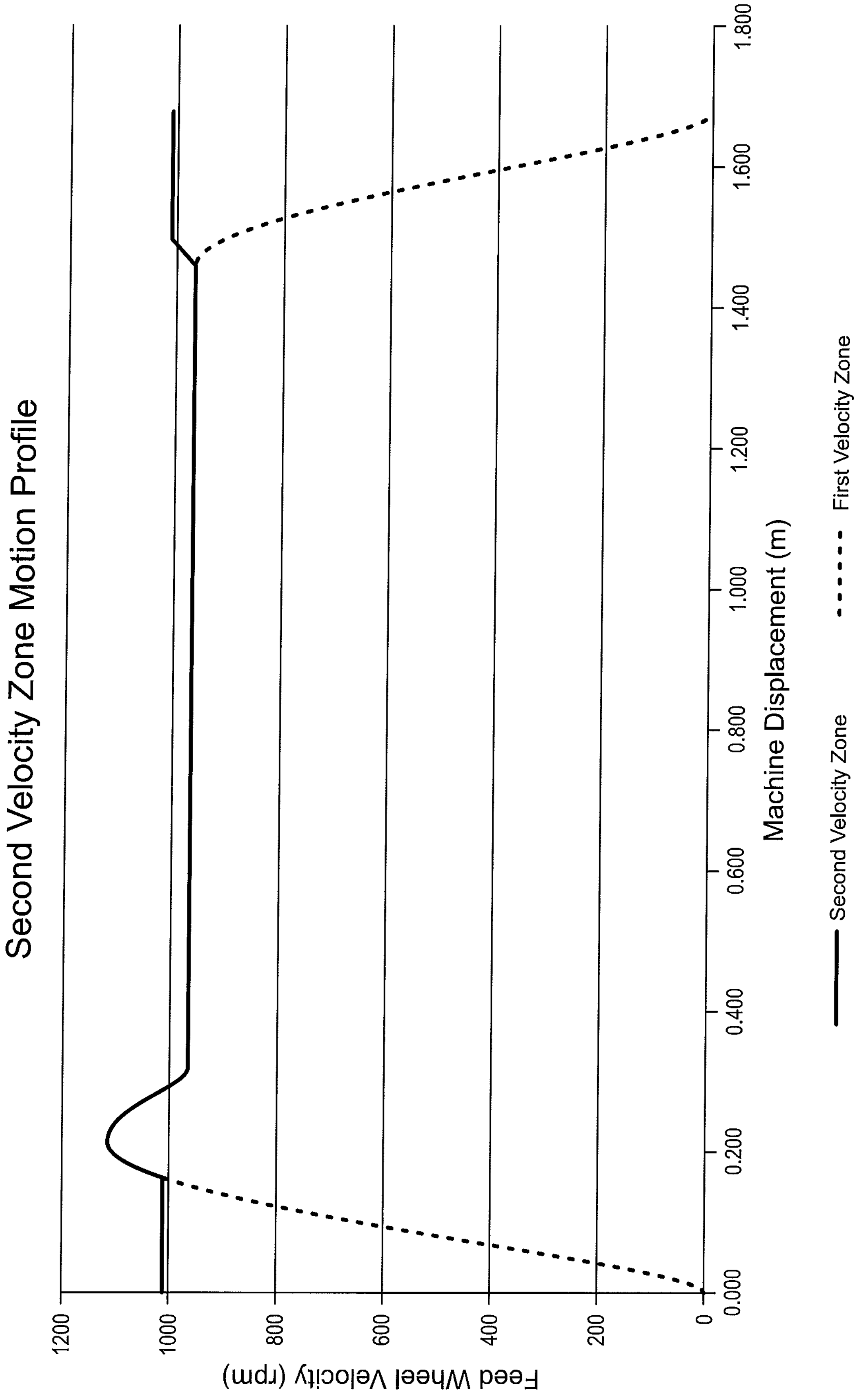
FIG. 5E is a second velocity zone motion profile data plot diagram illustrating the feed wheel velocity (in RPM) as a function of machine displacement (in meters) for the No-Feed-Roll sheet feeder apparatus of FIGS. 2-4B in accordance with the retrofitting and sheet feeding method of the present invention.
Figure 6:
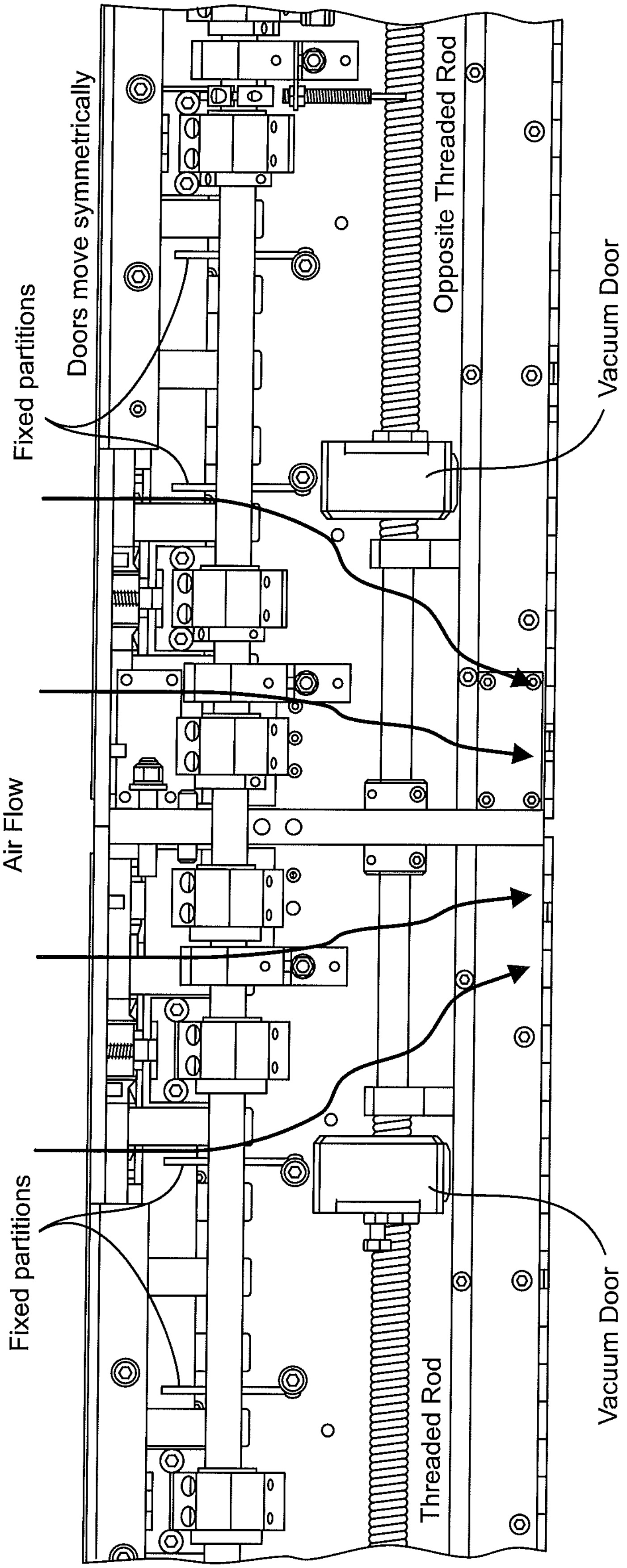
FIG. 6 is a plan view in elevation illustrating a vacuum section's air flow for the No-Feed-Roll sheet feeder apparatus of FIGS. 2-4B and retrofitting method of the present invention.
Figure 7:
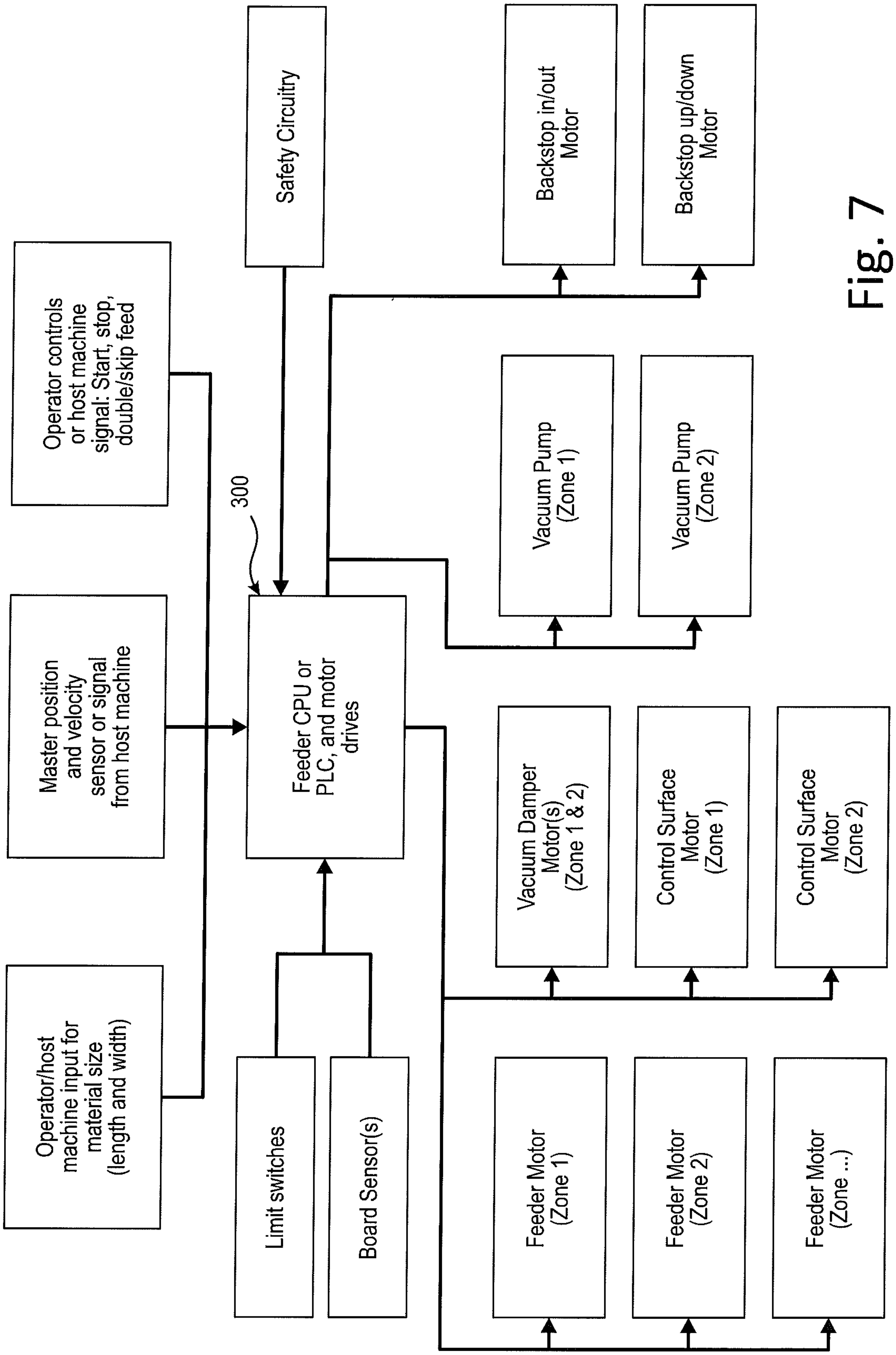
FIG. 7 is a block diagram illustrating the signal flow between a controller or computer and data input, sensor motor and pump components of the No-Feed-Roll sheet feeder apparatus of FIGS. 2-6 illustrating the retrofitting and sheet feeding controls and method of the present invention.

The sheet feeding apparatus of the present invention 200 (as illustrated in FIGS. 2-7) consists of a plurality (e.g., 2 or more) divided vacuum sections with chambers or boxes (e.g., 220, 230) with a plurality of wheeled shafts (e.g., 222, 224, 226, 232 and 234) driving grippy elastomeric covered feed wheels (e.g., 222W, 224W, 226W, 232W and 234W) which impart driving force to accelerate the lowermost sheet. Each of the sections has a movable control surface (e.g., 240, 250) with apertures configured to allow the feed wheels to project upwardly therethrough (e.g., as shown in FIG. 4A) and those movable control surfaces (e.g., 240, 250) can be raised or lowered to prevent or allow contact of a board or sheet with the feed wheels (e.g., 222W, 224W, 226W, 232W and 234W). These wheeled shafts are divided into one or more variable velocity zones leading to a constant velocity zone residing above (not shown) or below (see FIGS. 2-4A) the board or sheet's path of travel. Each velocity zone is independently driven with a dedicated and separately controlled electric motor. An initial variable velocity zone will always perform the entire motion profile to accelerate the sheet into the machine. Optionally, a second variable velocity zone, following the first, comes in contact with the sheet some distance after the sheet begins accelerating (due to driving force from the prior or first variable velocity zone). This second variable velocity zone only needs to perform a fraction of that velocity profile due to the nonzero initial velocity of the sheet as it enters the second variable velocity zone. During inactive periods, this second variable velocity zone decelerates to the nonzero initial sheet velocity, rather than zero, in anticipation of the next cycle. The final zone is driven at constant velocity, matching the machine velocity. The final zone is located such that the previous zone(s) will have already accelerated the sheet to constant velocity some distance before making contact with the wheels. In FIG. 4A, velocity zone 220 is illustrated with three shafts (222, 224, 226), velocity zone 230 is illustrated with two shafts (232, 234) and the final velocity zone is within host machine 10. FIG. 6 illustrates air flows in the vacuum box(es) of sheet feeder 200 and FIG. 7 is a signal flow diagram illustrating how the vacuum pumps are controlled for each vacuum box and how speed and other control data is used in sheet feeder 200. A controller (or feeder computer or CPU) 300 receives signal and data inputs from the host machine 10 and sensors and components in sheet feeder 200 as well as control signal outputs (e.g., to servo motors and to vacuum pumps.)

The primary servo motor 220M in the initial variable velocity zone 220 will perform a specific sheet or board motion profile (e.g., as illustrated and defined in FIGS. 5A-5F) designed to reduce the peak torque requirements of the machine. The motion profile generated using the apparatus of the present invention is a uniquely advantageous characteristic of the present invention. Peak torque specification is one of the leading limitations of commercially available servo motors. At the same time, traditional feeders need a significant amount of power to accelerate a sheet to machine velocity over a relatively short distance. To reduce peak torque, the velocity profile for sheet or board feeding system 200 is designed to accelerate the sheet at a lower rate than what would normally be required over a specific distance. The motor makes up for this by accelerating the sheet above machine speed momentarily for it to "catch up." The motor then decelerates the board to machine velocity. A servo motor performing such a motion profile will require a higher maximum velocity, but a lower peak torque rating. By returning the board to machine velocity at the proper time, it is ensured that the longest sheet that can be fed (maximum sheet) is not sacrificed. So the first plurality of feed elements or drive wheels (222W, 224W, 226W) in initial variable velocity zone 220 drive the board (e.g., 2) in a first motion profile, and are driven by a first dedicated computer controlled motor or servo system 220M (see FIG. 4A), while the second plurality drive wheels (232W, 234W) in second velocity zone 230 drive the board in a second motion profile, and are driven by a second dedicated computer controlled motor or servo system 230M.

Figure 3:
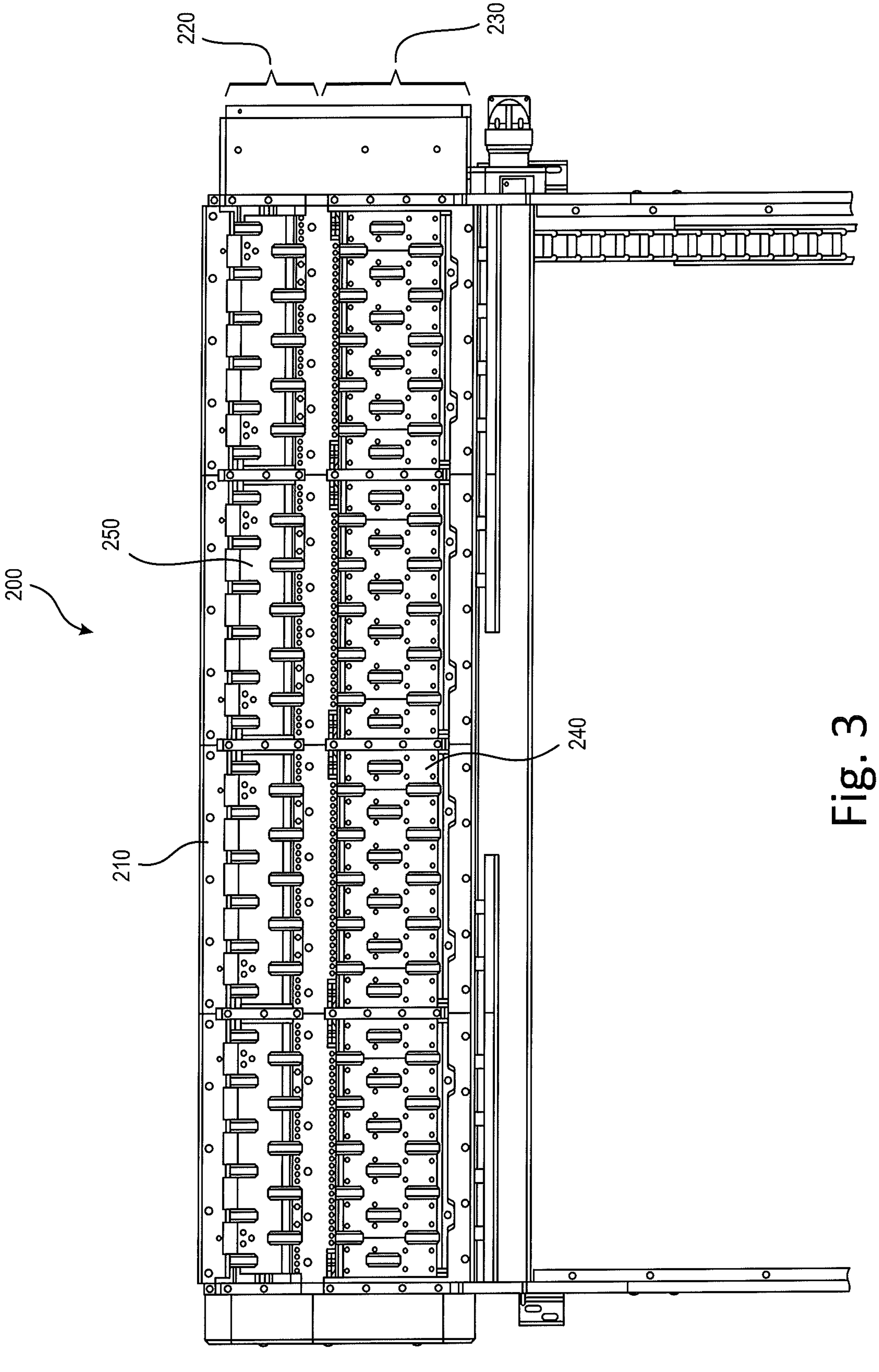
FIG. 3 is a top-side plan view illustrating the No-Feed-Roll sheet feeder apparatus of FIG. 2 and the retrofitting method of the present invention.
Figure 4A:
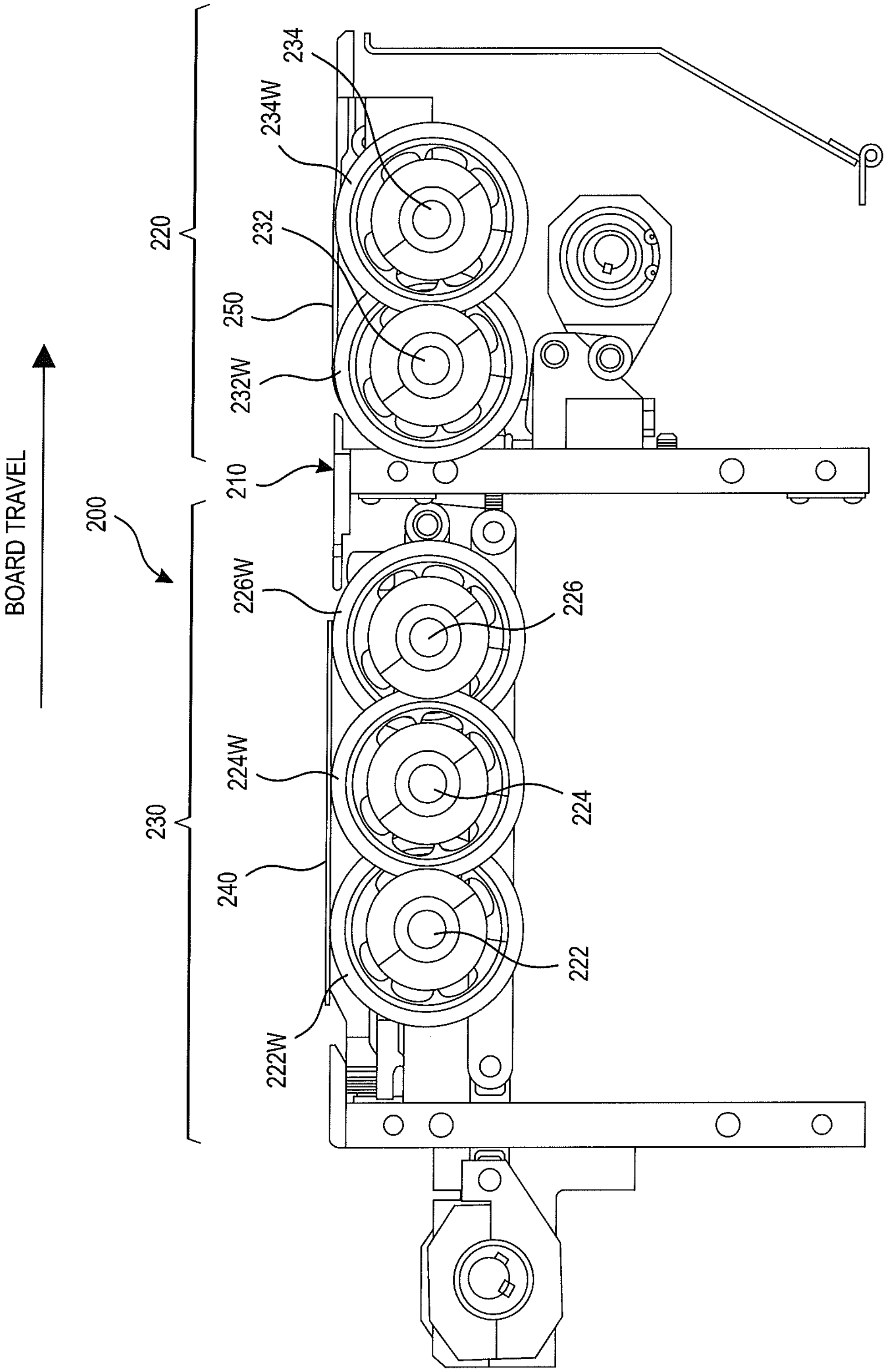
FIG. 4A is a side view in elevation illustrating the No-Feed-Roll sheet feeder apparatus and retrofitting method of FIGS. 2 and 3, in accordance with the present invention.
Figure 4B:
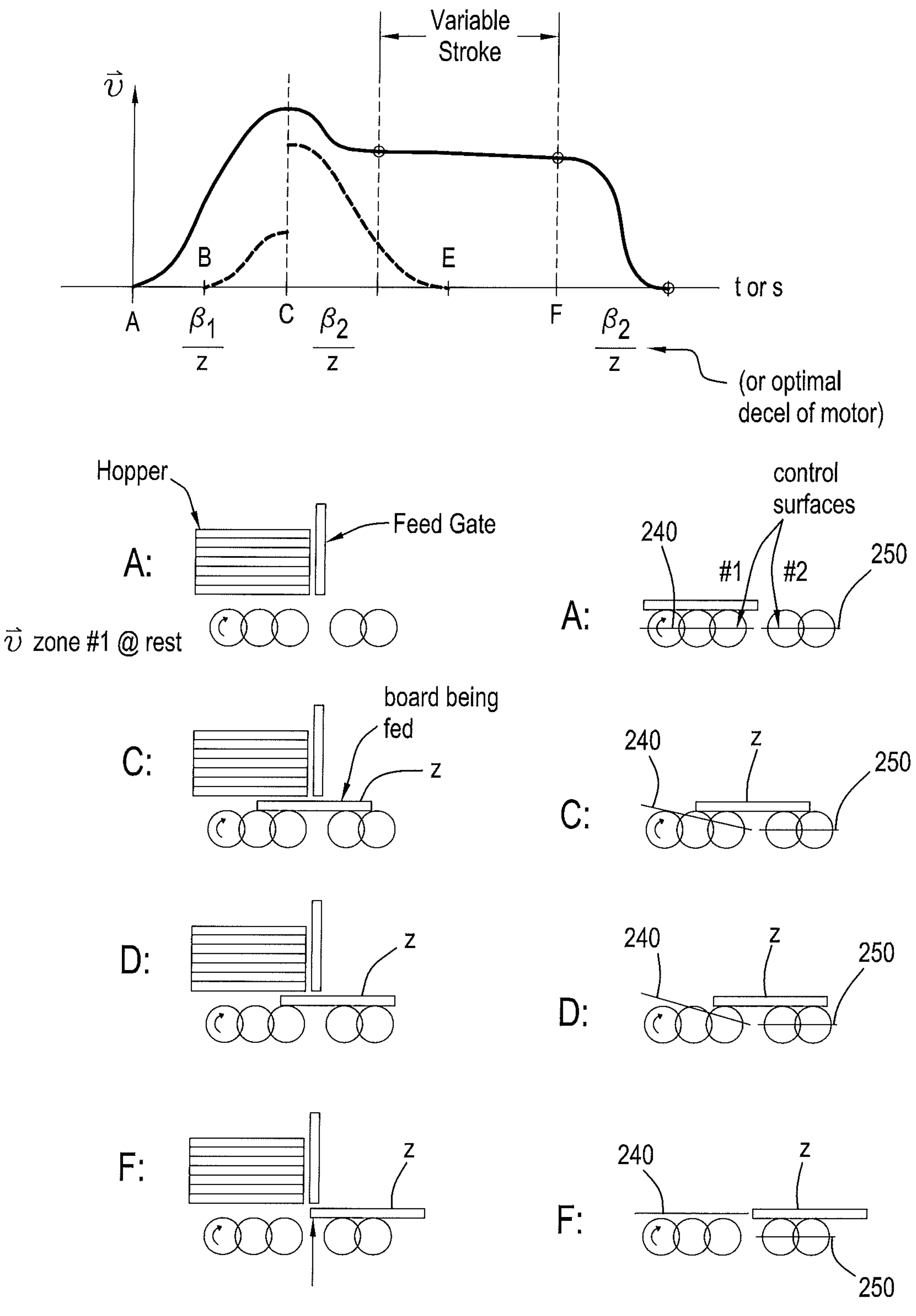
FIG. 4B is a multi-part diagram including a sheet velocity data plot diagram illustrating the sheet's velocity as a function of position (A-F) for the corrugated boards or sheets fed by the No-Feed-Roll sheet feeder apparatus of FIGS. 2-4A, and below that diagram are eight diagrams illustrating the orientations of the sheet and the control surfaces as sheets are fed from initial position A through position E to position F, in sequence, in accordance with the retrofitting and sheet feeding method of the present invention.

The position, velocity and acceleration of each board (e.g., 2) is controlled with a dedicated computer controlled motor in each velocity zone (e.g., 220), as illustrated in FIG. 4B, a multi-part diagram including a sheet velocity data plot diagram illustrating the sheet's velocity as a function of position (A-F) for the corrugated boards or sheets (e.g., 2) fed by the No-Feed-Roll sheet feeder apparatus 200, and below that diagram are eight diagrams illustrating the orientations of the sheet (e.g., 2) and the control surfaces (e.g., 240, 250) as sheets are fed from initial position A through position E to position F, in sequence, in accordance with the retrofitting and sheet feeding method of the present invention. FIG. 5A is a sheet velocity data plot diagram illustrating the sheet's velocity as a function of time for the corrugated boards or sheets fed by the No-Feed-Roll sheet feeder apparatus of FIGS. 2-4B in accordance with the retrofitting and sheet feeding method of the present invention. FIG. 5B is a diagram illustrating six (6) velocity profiles (machine velocity as a function of machine displacement "β" and position (A-E)) illustrating the machine speed profiles for the No-Feed-Roll sheet feeder apparatus of FIGS. 2-4B and retrofitting method of the present invention, as will be described in more detail below.

While vacuum pressure is needed throughout the feed table 210, it must be divided into at least two sections (e.g., 220, 230). One section (230) handles the environment of the initial vacuum box, where the stack of sheets always restricts the airflow and high pressure holds the sheets down. The next section (220) is an open-air vacuum box that is only covered for a fraction of the machine cycle by the sheet being fed. This section needs to be maintained with a separate high flow vacuum blower. Both vacuum boxes have a lateral restricting mechanism to alter the vacuum area based on the sheet size. This restriction is performed by manually operating a series of flaps on the outside of the feed table. Alternatively, an electrically-controlled mechanism that adjusts two opposing baffles (see, e.g., FIG. 6) symmetrically is using a single source of motion. An automated system using a pressure transducer to monitor vacuum and stop moving the baffles when the desired vacuum is preferred, for simplicity, reliability, ease of maintenance and economy.

Previous feed table designs have used a four-bar linkage mechanism to control the sheet. The sheet being fed needs to contact the driving wheels, but the following sheet cannot make contact with rotating wheels without causing a jam. A mechanism raised a series of control surfaces in unison above the driving wheels when contact was not desired. At the start of the next cycle, an alternating shaft would lower the surfaces and the sheet would make contact with the wheels moving at a minimal safe velocity. The linkage members were designed such that the control surfaces remained horizontal and exposed or concealed the driving wheels all at once. The prior art design relied on the machine's feed rolls to control the sheet, and any additional driving force from the feed table wheels was nonessential extra support. In the system of the present invention, without feed rolls, the driving wheels need to contact the sheet as much as possible. A new linkage design, using unequal length members, angles each control surface (e.g., 240, 250) which sequentially conceals each wheel as the sheet is fed into the machine. Subsequently, the sheet is driven for a longer period of time and distance. In a resting position, the control surface (e.g., 240, 250) sits horizontally above the driving wheels and prevents contact with the sheet. This motion can also be performed with cams raising and lowering each end of any control surface control surface (e.g., 240, 250) independently to create the desired angle. Either mechanism is controlled by a single servo motor performing a variable motion profile. Each variable velocity zone will require one or more control surface mechanisms. Only the constant velocity zone does not require such a mechanism.

Another advantageous feature of the servo motion profile illustrated in FIGS. 5A-5E is the adjustable dwell period. As long as the sheet or board (e.g., 2) being fed is still over the driving wheels, the wheels can continue to drive the board. This can continue until either the edge of the board passes, or a specific time where the wheels need to begin decelerating in preparation for the next cycle. At this time a selected control surface (e.g., 240, 250) defined in feed table 210 rises into place to break contact between the board and the wheels. Referring next to FIGS. 5A and 5B, each board or sheet (e.g., 2) is taken from a hopper or is initially at rest and then is accelerated over a sequence of points (A, B, C, D, and E) to a velocity which will as nearly as possible exactly match the desired selected machine speed for host machine 10. This acceleration happened over the sequence of velocity zones (e.g. 220, 230).

Referring specifically to the diagram of FIG. 5B, a diagram illustrating six (6) velocity profiles (machine velocity as a function of machine displacement "β") illustrating the machine speed profiles for the No-Feed-Roll sheet feeder apparatus 200 of FIGS. 2-4B and retrofitting method of the present invention, the Initial conditions may be defined as:

$$V_1(C) = V,\ V_1 + V_3 = V_2,\ \beta = \frac{B^1}{2} + \frac{B^2}{2},\ \text{and} \qquad \text{(Eqs. 1 and 2)}$$

$$h = \text{chase } \beta,$$

$$V_4(C) = V,\ V_4 + V_6 = V_5,\ \beta_1 = X \cdot \beta_2 \qquad \text{(Eqs. 3 and 4)}$$

Referring next to FIG. 5C, it was desired to control board velocity and displacement in such a way as to effectively take the first half of velocity curve 2, connect the second half of velocity curve 6 to the end of velocity curve 2. The area under the velocity curve, which total displacement, h then becomes:

(I)

$$h = \frac{h^2}{2} + \frac{h^h}{2} + \left(\frac{B_2}{2} \cdot V_1(C)\right) \qquad \text{(Eq. 5)}$$

Figure 1B:
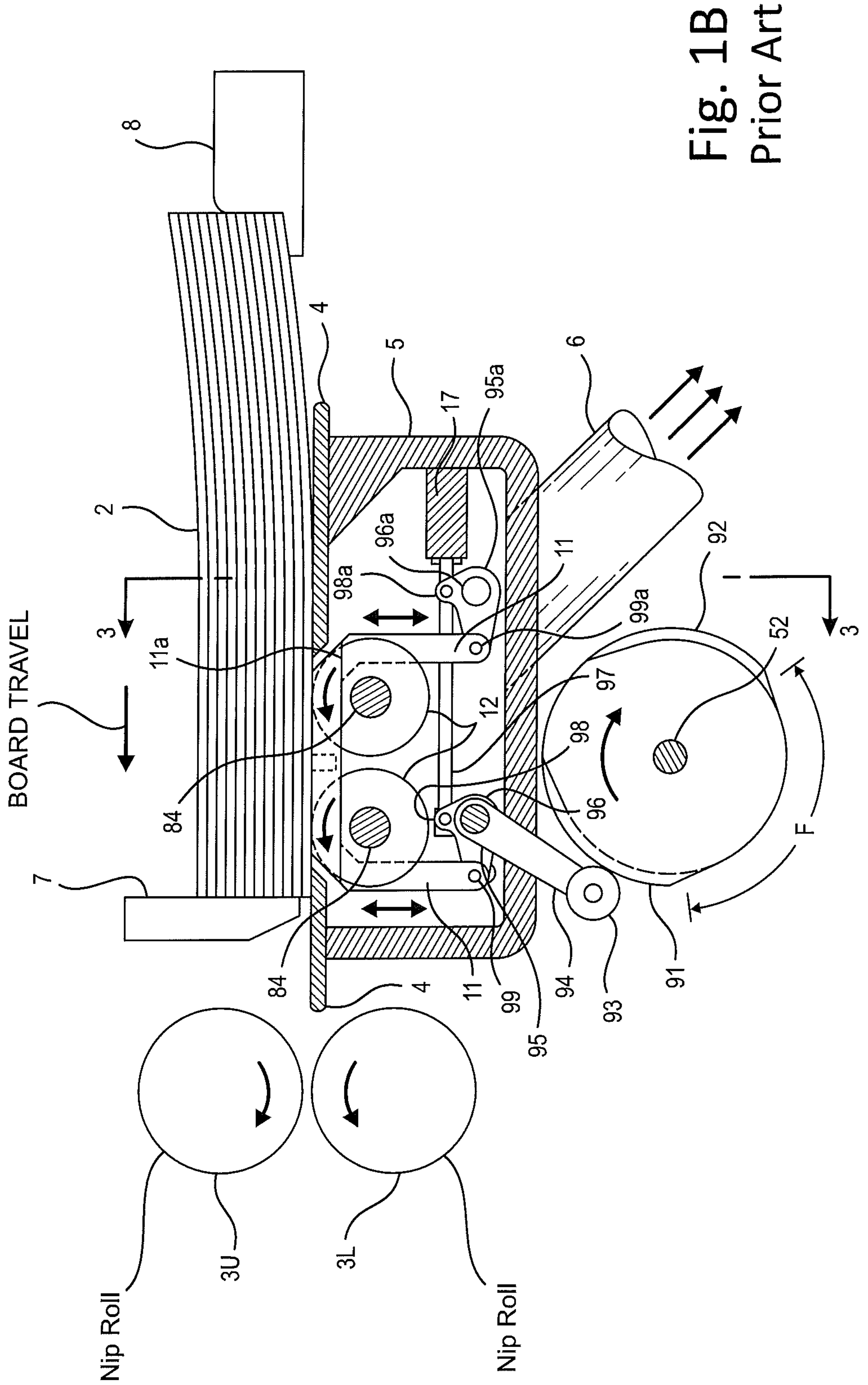
Fig. 1B Prior Art
FIG. 1B illustrates a diagrammatic side view of a typical sheet feeder for feeding sheets into the finishing machine of FIG. 1A, in accordance with the Prior Art.
Figure 1C:
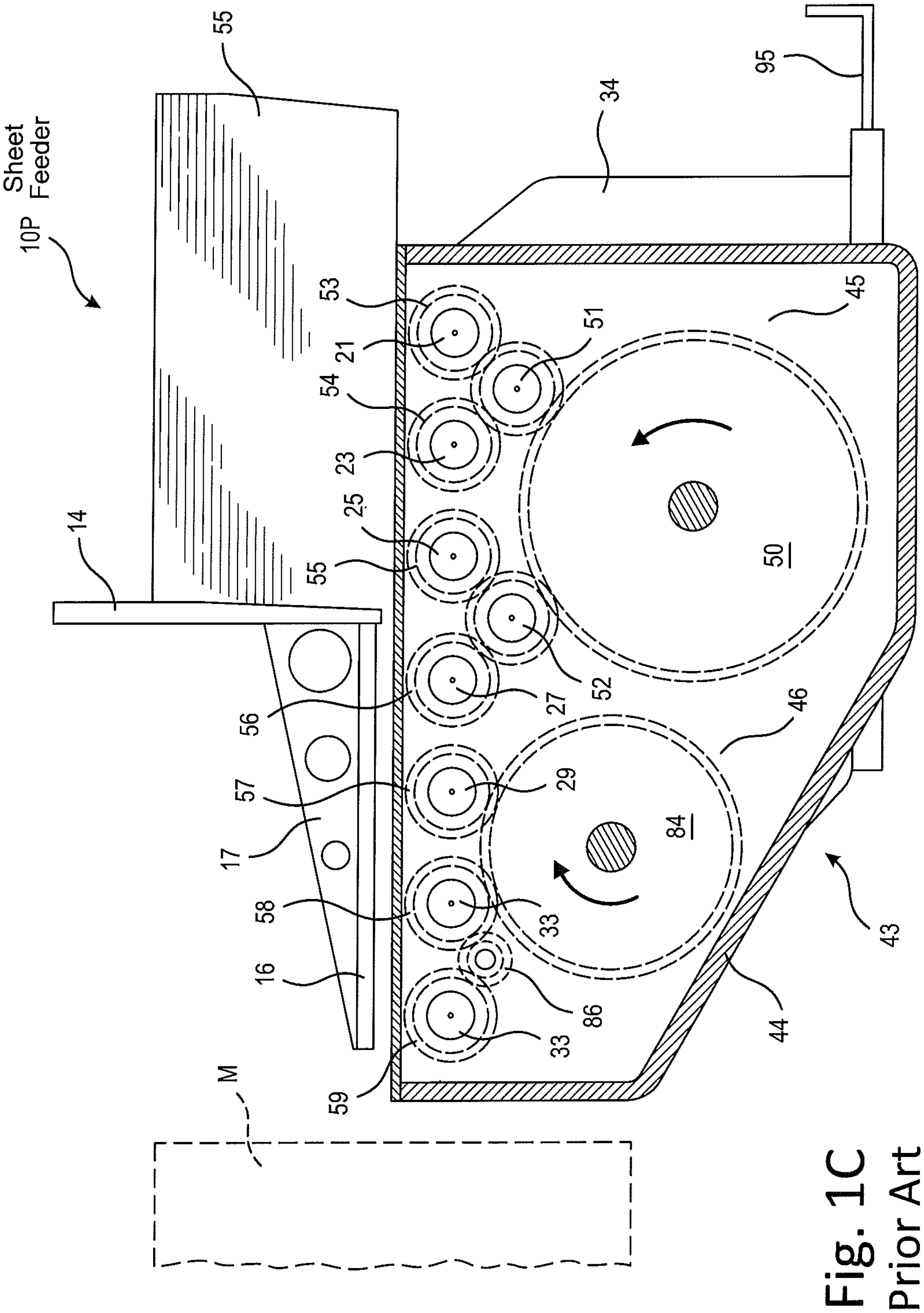
Fig. 1C Prior Art
FIG. 1C illustrates a diagrammatic side view of a second, type of sheet feeder for feeding sheets into the finishing machine of FIG. 1A, in accordance with the Prior Art.

With Sun's Extend-o-feed™ system (as shown in FIG. 1B and described in commonly owned U.S. Pat. No. 5,184,811), using a 120° modified-sine acceleration curve, each board (e.g., 2) covers about 92% of the machine displacement due to feeding acceleration. This machine displacement coverage is called the "Chase".

To derive the desired control signals for each velocity zone in sheet or board feeding system 200, the applicant's development work Assumed/Defined:

The displacement of β1 is directly related to that of $\beta_2$ by a constant, X. (where $\beta_1/\beta_2=X$).

$$\text{Therefore, } h3 = X \cdot h_6 \qquad \text{(Eq. 6)}$$

This leads to Modified Sine Equations, where:

- Y=Board displacement at any point in time.
- β=Total machine displacement until board reaches const. velocity.
- h=Total board displacement until board reaches const. velocity. Chase: h/β %
- $\beta_1$=Total machine displacement for the first part of the accel. curve.
- $\beta_2$=Total machine displacement for the second part of the accel. curve.
- ⊖=Machine displacement at a specific point in time.

(II) Displacement, y=Kh [radians]

(III) Velocity, v=(Cv)(h) V/β where, V is input speed in radians/sec. and h and B are in radians.

(IV) Acceleration, a=Ca h $(V)^2/\beta$ [radians/$\sec^2$]

Where, for $0 \le \frac{\theta}{B} \le \frac{1}{B}$:

$$k = \frac{\Pi}{4+\Pi} \cdot \frac{\ominus}{B} - \frac{1}{4(4+\Pi)} \cdot \sin\left(4\Pi \frac{\ominus}{B}\right) \qquad \text{(Eq. 7)}$$

$$C_v = \frac{\Pi}{4+\Pi}\left(1 - \cos\left(4\Pi \frac{\ominus}{B}\right)\right) \qquad \text{(Eq. 8)}$$

$$C_a = \frac{4\Pi^2}{4+\Pi} \cdot \sin\left(4\Pi \frac{\ominus}{B}\right) \qquad \text{(Eq. 9)}$$

And for $\frac{1}{B} \le \frac{\ominus}{B} \le \frac{7}{B}$:

$$k = \frac{\Pi}{4+\Pi} \cdot \frac{\ominus}{B} - \frac{9}{4+\Pi} \cdot \cos\left(\frac{4\Pi}{3}\frac{\ominus}{B} - \frac{\Pi}{6}\right) \qquad \text{(Eq. 10)}$$

$$C_v = \frac{\Pi}{4+\Pi} + \frac{3\Pi}{4+\Pi} \cdot \sin\left(\frac{4\Pi}{3}\frac{\ominus}{B} - \frac{\Pi}{6}\right) \qquad \text{(Eq. 11)}$$

$$C_a = \frac{4\Pi^2}{4+\Pi} \cdot \cos\left(\frac{4\Pi}{3}\frac{\ominus}{B} - \frac{\Pi}{6}\right) \qquad \text{(Eq. 12)}$$

And for $\frac{7}{B} \le \frac{\ominus}{B} \le 1$:

$$K = 1 - \frac{\Pi}{4+\Pi} + \frac{\Pi}{4+\Pi}\frac{\ominus}{B} - \frac{1}{4(4+\Pi)} \cdot \sin\left(2\Pi\left(2\frac{\ominus}{B} - 1\right)\right) \qquad \text{(Eq. 13)}$$

$$C_v = \frac{\Pi}{4+\Pi}\left[1 - \cos\left(2\Pi\left(2\frac{\ominus}{B} - 1\right)\right)\right] \qquad \text{(Eq. 14)}$$

$$C_a = \frac{4\Pi^2}{4+\Pi} \cdot \sin\left(2\Pi\left(2\frac{\ominus}{B} - 1\right)\right) \qquad \text{(Eq. 15)}$$

Remembering:

Y=Board displacement at any point in time.

β=Total machine displacement until board reaches const. velocity.

h=Total board displacement until board reaches const. velocity. Chase: h/β %

$\beta_1$=Total machine displacement for the first part of the accel. curve.

$\beta_2$=Total machine displacement for the second part of the accel. curve.

⊖=Machine displacement at a specific point in time.

Taking the initial condition that $V_1(C)=V$ to solve for $h_1$ in section III (above)

$$V_1(C) = V = C_v h_1\left(\frac{V}{B_1}\right)\text{at point "C"} = \tag{Eq. 16}$$

$$1.75957 = \frac{\Pi}{4+\Pi} + \frac{3\Pi}{4+\Pi}\cdot\sin\left(\frac{4\Pi}{3}\left(\frac{\ominus}{B}\right) - \frac{\Pi}{6}\right.$$

Where ⊖ is 0.5, and $$h_1 = \left(\frac{B^1}{V}\right)\frac{V}{C_v}, \text{ so}$$

$$h_1 = \frac{B_1}{C_v s_n\text{"r"}} \text{ and so} \tag{V}$$

$$h_u = \frac{B_2}{C_v s_n\text{"c"}} \tag{VI}$$

Next, solving for $h_2$ in equation 5 in section (I) in terms of h and β:

$$\text{Substitute:} h_6 = \frac{h_3}{x},\ h_3 = h_2 - h_1,\ V_1(c) = V \tag{Eq. 17}$$

$$h = \frac{h_2}{2} + \frac{h_{2-h1}}{2X} + \frac{B_2 V}{2} \rightarrow 2(h) = \left(\frac{h_2}{2} + \frac{h_2}{2X} - \frac{h_1}{2X} + \frac{B_2 V}{2}\right)2$$

$$2h = h_2 + \frac{h_2}{X} - \frac{h_1}{X} + B_2 V$$

$$h_2\left(1 + \frac{1}{X}\right) = 2h + \frac{h_1}{X} - B_2 V$$

$$h_2 = \frac{2h + \frac{h_1}{X} - B2V}{1 + \frac{1}{Y}} \tag{VII}$$

Assuming V=1 so $h_1$ is per unit of machine velocity. It is known that:

(VIII) $h_3=h_2-h_1$, (IX) $h_6=h_3/x$ and (X) $h_5=h_4+h_6$

So, for Board Displacement: $y_1+Kh_1$ (piecewise) and for θ/β (from point A to point C):

$$0 \le (\theta/\beta) \le 1/2 \text{ and}$$

$$\text{(XI) } y=y_2=Kh_2 \tag{Eq. 18}$$

$$\text{And where } (\theta_1/\beta_1)=(\theta/\beta), \text{ so (XII) } \theta=(\theta/\beta)\beta_1 \tag{Eq. 19}$$

Thus, for θ/β from point C to point D, ½≤(θ/β)≤1, and $(\theta_2/\beta_2)=(\theta/\beta)$ Which leads to:

$$\text{(XIII) } y=y_{2@c}+(y6-y6_{@c})+(\theta_2-\theta_{1@c})\times V \tag{Eq. 20}$$

Referring now to FIG. 5D, the total board displacement from A to C is represented by the area in section 400 (corresponding to $y_{2@c}$) while the area 402 represents the board displacement due to the second half of the $h_6$ curve ($y6-y6_{@e}$) and the third area 404 represents the area under the velocity curve due to shifting the second part of $h_6$ up to match $h_2$ (which corresponds to the third part of Eq. 20, "(θ2−θ1@c)×V".

Starting with the total machine displacement occurring from A to C (e.g., as illustrated in FIGS. 4B and 5B) due to following the $\theta_1$ curve one can add the displacement due to $\theta_2$ and then subtract the first half of $\theta_2$ since it was desired to follow $\theta_1$ from point A to point C, which provides:

$$\text{(XIV) } \theta_2=((\theta_{@c}/\beta)\times\beta_1)+((\theta/\beta)\times\beta_2)-((\theta_{@c}/\beta)\times\beta_2) \tag{Eq. 21}$$

So the total machine displacement from point A to point C (due to $\beta_1$) is "$((\theta_{@c}/\beta)\times\beta_1)$" and the machine displacement from point C due to $\theta_2$ (due to $\beta_2$) is represented by the second part of Eq. 21, "$((\theta/\beta)\times\beta_2)-((\theta_{@c}/\beta)\times\beta_2)$".

Finally, calculating Board Velocity:

$$v_i = C_v h_i \frac{V}{B_i} \tag{Eq. 22}$$

Figure 2:
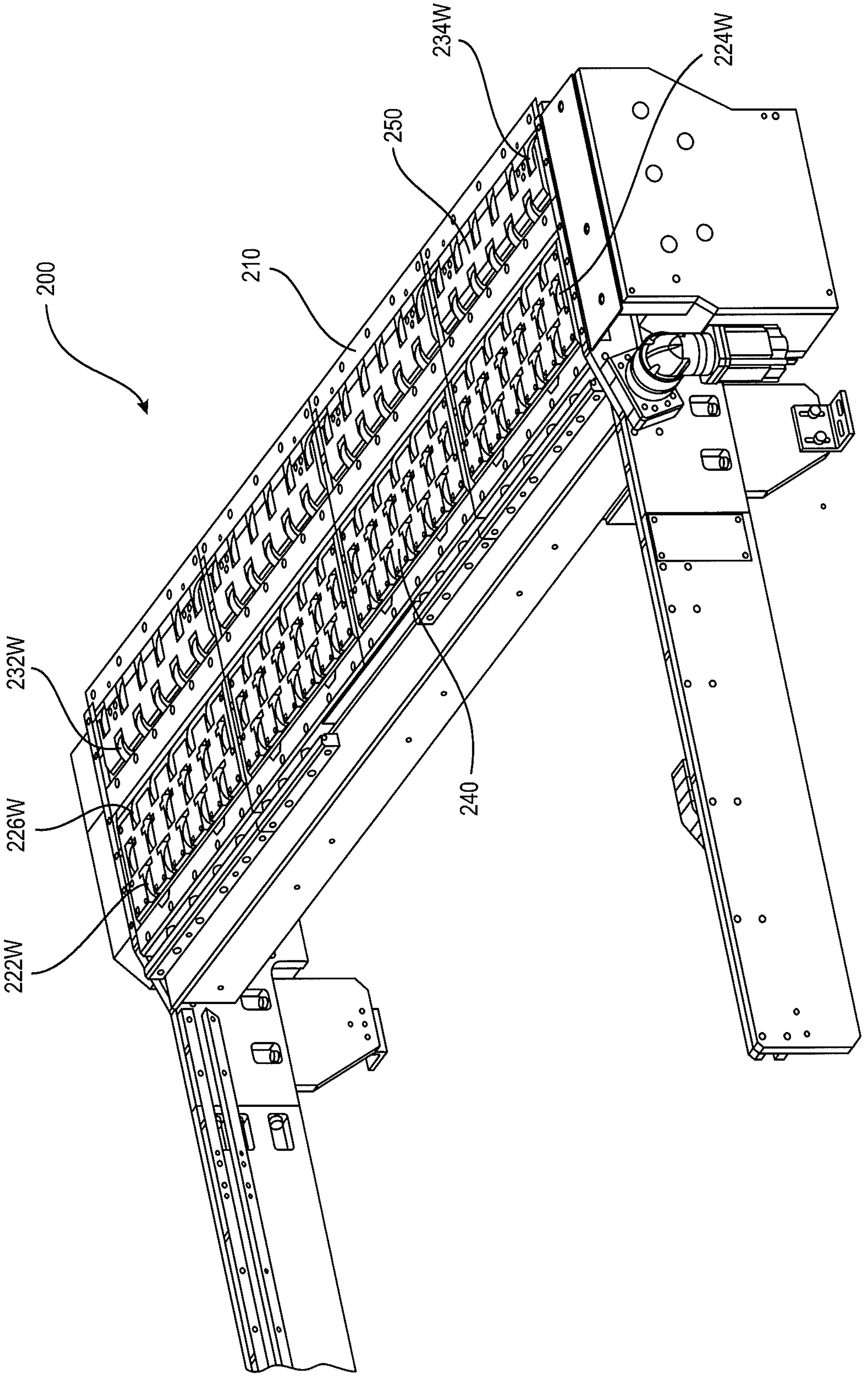
FIG. 2 is a perspective view in elevation illustrating the No-Feed-Roll sheet feeder apparatus configured and programmed for use with the typical finishing machine for feeding corrugated sheets from a hopper to following machine sections of FIG. 1, once the prior art sheet feeder 12 is removed for replacement as part of the upgrading or retrofitting method of the present invention.

As noted above, FIG. 5D illustrates the board displacement profiles (velocity as a function of position, illustrating three areas, namely, board displacement from A to C, board displacement due to the second half of the h6 curve and the area under the velocity curve due to shifting of the second part of $h_6$ up to match $h_2$), in accordance with the method of the present invention, while FIG. 5E is a second velocity zone motion profile data plot diagram illustrating the feed wheel velocity (in RPM) as a function of machine displacement (in meters) for the No-Feed-Roll sheet feeder apparatus 200 of FIGS. 2-4.

The advantages of sheet feeder 200 and the retrofit method of the present invention (for installing sheet feeder 200 into host machine 10) will enhance the host machine's operation, for a few reasons, including:

a. On any feeder, the registration error caused by wheel tread wear depends on the location of the feed roll nip, which the sheet feeder 200 of the present invention machine does not have. Any speed deviation between the feeder 200 and the host machine 10 will accumulate until the machine takes control of the board. On a typical (prior art) feeder this is a couple of inches until the board reaches the feed rolls. With the sheet feeder 200 the board is controlled for a longer duration. In the system and method of the present invention, the interval during which the board is under positive control is at least double that of the prior art feeder (e.g., 12), probably more, until the vacuum transfer (e.g., in host machine 10) fully takes over.

b. The program stored in the controller's memory may be adapted to compensate for this difference. Here, the method is similar to the compensation method in applicant's Micro-grind™ system which compensates for anvil blanket thickness after intentional removal of material. The system's controller (e.g., 300) is preferably programmed to automatically adjust feeder speed with a sensor at the end of the wheelbox. The sensor must react quickly enough to get an accurate reading depending on desired accuracy and machine speed.

c. Given this data, one may estimate the average wheel tread diameter (e.g., for feed wheels 222W, 224W, 226W, 232W and 234W) and, at a selected diameter change threshold provide an indication recommending that the machine user prepare to change the wheel treads when required for performance, accuracy, or safety reasons.

Persons of skill in the art will appreciate that the system 200 and method of the present invention provides a new and surprisingly effective and cost efficient corrugated board or paperboard sheet feeder apparatus 200 and sheet feeder retrofitting method where the sheet feeding apparatus is capable of feeding a single sheet (e.g., 2) from a stack of corrugated boards sheets that travels from a feed end to a delivery end, and into a host machine 10. The sheet feeder 200 includes a supporting feed table surface 210 including a feed end and a delivery end and has rows of feed elements or drive wheels (e.g., 222W, 224W, 226W, 232W and 234W). As illustrated in FIGS. 2-4B, the feed elements or drive wheels are configured as a first plurality of feed elements in an initial variable velocity zone 220 which drive the board in a first motion profile, being driven by a first servo system 220M. A second plurality of feed elements in a second velocity zone 230 drive the board in a second motion profile, and are driven by a second servo system 230M in a second motion profile (see FIGS. 5A-5E). The first plurality of feed elements in initial variable velocity zone 220 are arranged in a first plurality of rows which extend transverse to the direction of travel of the sheet from the feed end to the second plurality of feed elements in second velocity zone 230 which are arranged in a second plurality of rows which extend from the first plurality of feed elements to the delivery end.

A first vacuum powered suction zone which acts on the board in initial variable velocity zone 220 and draws through supporting feed table surface 210 holds the board or sheet, holding it against the first plurality of feed elements while the board is being fed. A second vacuum powered suction zone corresponds to second velocity zone 230 and holds the sheet against the second plurality of feed elements while being fed. In sheet feeder system 200, all of these elements are controlled by a pre-programmed controller 300 (including a processor and memory, and signal receiving and signal transmission connections. The system's controller is programmed and configured to receive a predetermined velocity signal from the host machine 10 and generate (i) a first initial variable velocity control signal for initial variable velocity zone 220 and (ii) a second velocity control signal for second velocity zone 230 in response to the host machine's predetermined velocity signal.

Turning now to FIG. 6, a vacuum section's air flow for the No-Feed-Roll sheet feeder apparatus of FIGS. 2-4B is shown. As noted above, vacuum pressure is needed throughout the feed table 210 of the present invention, and it is preferably divided into two sections (e.g., 220, 230). In each initial vacuum section (which handles the environment of the initial vacuum box, where the stack of sheets (e.g., 2) always restricts the airflow) high pressure holds the sheets down. Both vacuum sections include boxes which have a lateral restricting mechanism to alter the vacuum area by moving vacuum doors based on the sheet size. As illustrated in FIG. 6, air flows in through apertures in the feed table surface and downwardly drawing the boards against the feed wheels (e.g., 222W, 224W, 226W, 232W and 234W). The vacuum doors preferably move symmetrically, and lateral vacuum restriction is preferably performed by operating a series of flaps on the outside of the feed table. In the preferred embodiment, an electrically-controlled mechanism adjusts two opposing baffles symmetrically using a single source of motion, and in applications or host machines of an asymmetrical configuration, two or more motors may be employed. An automated embodiment of the system of the present invention includes a pressure transducer to monitor vacuum and stop moving the baffles (or change the vacuum pump speed) when the desired vacuum is achieved. Alternatively, the baffles may be moved to a pre-selected and calibrated location based on input sheet size or a particular job's requirements (or recipe).

Turning next to the diagram of FIG. 7, the signal flow between a controller or computer 300 and data input, sensor motor and pump components of the No-Feed-Roll sheet feeder apparatus of FIGS. 2-6 is shown. The feeder CPU, PLC or controller 300 includes a memory and stores programs adapted for operating feeder system 200 to achieve the board movements described above. Feeder CPU inputs include sheet or board sensors, limit switch signal inputs, a master position and velocity sensor or signal input from host machine 10 and operator controls including inputs for start, stop, double/skip, material size and feed status inputs as well as interlock and safety circuit inputs. The Feeder CPU 300 is programmed and configured to generate several output signals including signals controlling the feeder motors in each zone or section (220M, 230M), control surface motors in each section (240M, 250M), vacuum dampers and motors in each section and vacuum baffle or door position servos in each section.

Having described preferred embodiments of a new and improved apparatus and method, it is believed that other modifications, variations and changes will be suggested to those skilled in the art in view of the teachings set forth herein. It is therefore to be understood that all such variations, modifications and changes are believed to fall within the scope of the present invention as set forth in the appended claims.

What is claimed is:

1. A corrugated board or paperboard sheet feeder apparatus capable of feeding a single sheet from a stack of sheets into a host machine, comprising:

a) a sheet supporting feed table surface having a feed end and a delivery end and having feed elements for feeding a sheet through the feeder apparatus from said feed end to said delivery end;

b) said feed elements comprising a first plurality of feed elements in a first variable velocity zone and arranged in a first plurality of rows which extend transversely to a direction of travel of a sheet through said feeder apparatus;

c) a first dedicated controlled motor or serve system to drive said first plurality of feed elements in a controllable first motion profile;

d) said feed elements further comprising a second plurality of feed elements in a second velocity zone adjacent said first velocity zone and arranged in a second plurality of rows which extend transversely to the direction of travel of a sheet through said feeder apparatus;

e) a second dedicated controlled motor or servo system to drive said second plurality of feed elements in a controllable second motion profile;

f) a first vacuum powered suction section located below said supporting feed table surface and corresponding to said first initial variable velocity zone for holding a sheet against said first plurality of feed elements while being fed thereby;

g) a second vacuum powered suction section located below said supporting feed table surface and corresponding to said second velocity zone for holding a sheet against said second plurality of feed elements while being fed thereby;

h) a controller configured to receive a sheet velocity signal from a host machine and to generate (i) a first control signal for said first motor or servo system and (ii) a second control signal for said second motor or servo system in response to said velocity signal to feed said sheet through the feeder apparatus at selected velocity profiles in said first and second velocity zones;

i) airflow restrictors for said first and second vacuum powered suction sections movable to alter a respective vacuum area based on sheet size whereby each suction section has sufficient vacuum to hold sheets being fed against said feed elements;

j) horizontal control surfaces on said table surface and located above said feed elements in a rest position to prevent contact between the feed elements and a sheet being fed by said feeder apparatus; and k) a controllable drive mechanism connected to each control surface and configured to move said control surfaces to selectively cover or uncover feed elements to contact and drive a sheet being fed in accordance with a variable drive motion profile;

wherein said controllable drive mechanisms selectively angle the respective control surfaces to sequentially conceal the respective feed elements as a sheet is fed through the sheet feeder apparatus.

2. A sheet feeder apparatus for supplying sheets from the feeder apparatus to a sheet processing host machine having a predetermined nominal sheet velocity, comprising:

(a) a first set of drive elements for driving a sheet through a first velocity zone in said feeder apparatus;

(b) a second set of drive elements for driving the sheet through a second velocity zone in said feeder apparatus;

(c) a controller for said feeder apparatus, wherein the controller is configured to:

supply a first set of drive signals to said first set of drive elements for controlling the velocity of said sheet in said first velocity zone in a first motion profile having an initial sheet velocity lower than said host machine nominal velocity and a second sheet velocity higher than said host machine nominal velocity as the sheet passes through the first velocity zone; and supply a second set of drive signals to said second set of drive elements for controlling the velocity of said sheet in the second velocity zone in a second motion profile having an adjustable constant sheet velocity equal to said host machine nominal velocity to deliver said sheet to said host machine at said nominal velocity;

(d) first and second control surface sets in said first and second velocity zones, respectively, movable to expose and conceal said first and second sets of drive elements; and wherein the controller is further configured to generate first and second control surface signals to move said control surface sets through a sequence of positions to selectively provide contact between said drive elements and said sheet to drive said sheet at a variable velocity in accordance with said first and second motion profiles.

3. The apparatus of claim 2, further including a controllable vacuum for each of said first and second velocity zones to provide air flow to engage said sheet with said first and second sets of drive elements in said first and second velocity zones.

4. A computer controlled corrugated board sheet feeder apparatus configured to retrofit a pre-existing host corrugated board processing machine, comprising:

a feed table surface for receiving corrugated boards at a feed end and moving them to a delivery end;

first drive wheels mounted in a first variable velocity zone of said table surface to drive boards sequentially in a first motion profile through a first vacuum zone;

second drive wheels mounted in a second velocity zone of said table surface to drive boards received from said first velocity zone in a second motion profile through a second vacuum zone to the delivery end;

a controller configured to receive predetermined velocity signals from the host machine to generate a first variable velocity control signal for the first variable velocity zone and a second velocity control signal for the second velocity zone based on the predetermined velocity signals from the host machine, a dedicated primary servo motor in the first variable velocity zone configured to perform said first motion profile based on the first variable velocity control signal, wherein the controller is configured to control the primary servo motor to perform the first motion profile including accelerating a board to a velocity above a velocity of the host machine and then decelerating the board to the velocity of the host machine;

a variable vacuum generator and variable control surface in each of said first and second velocity zones;

wherein said control surfaces in said first and second velocity zones are mounted above corresponding drive wheels in said zones to prevent boards from contacting said drive wheels; and a drive mechanism for each said control surface to independently lower and raise said control surfaces to sequentially engage boards with selected drive wheels as boards are fed through said feeder apparatus and into the host machine;

wherein the controller is configured to control the variable vacuum generators and the drive mechanisms of said control surfaces of said first and second velocity zones.

* * * * *